(12) United States Patent (10) Patent No.: US 8,996,778 B2
Alshinnawi et al. (45) Date of Patent: Mar. 31, 2015

(54) CABLE ADAPTER CORRELATION IN A CLUSTER

(71) Applicant: International Business Machines Corporation, Armonk, NY (US)

(72) Inventors: Shareef F. Alshinnawi, Durham, NC (US); Gary D. Cudak, Creedmoor, NC (US); Edward S. Suffern, Chapel Hill, NC (US); J. Mark Weber, Wake Forest, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 244 days.

(21) Appl. No.: 13/713,250

(22) Filed: Dec. 13, 2012

(65) Prior Publication Data

US 2014/0173156 A1 Jun. 19, 2014

(51) Int. Cl.
*G06F 13/36* (2006.01)
(52) U.S. Cl.
CPC ..................................... *G06F 13/36* (2013.01)
USPC ......................................................... 710/305
(58) Field of Classification Search
USPC ......................................................... 710/305
See application file for complete search history.

(56) References Cited

U.S. PATENT DOCUMENTS

| | | | | |
|---|---|---|---|---|
| 5,570,002 | A * | 10/1996 | Castleman | 323/283 |
| 5,729,204 | A * | 3/1998 | Fackler et al. | 340/2.4 |
| 5,870,626 | A | 2/1999 | Lebeau | |
| 6,397,268 | B1 * | 5/2002 | Cepulis | 710/8 |
| 6,530,085 | B1 * | 3/2003 | Perlman | 725/82 |
| 6,968,994 | B1 * | 11/2005 | Ashwood Smith | 235/375 |
| 8,184,933 | B1 * | 5/2012 | Aybay | 385/100 |
| 8,447,803 | B2 * | 5/2013 | Boucher et al. | 709/203 |
| 2003/0140345 | A1 * | 7/2003 | Fisk et al. | 725/78 |
| 2004/0189733 | A1 * | 9/2004 | Yamamoto et al. | 347/19 |
| 2007/0260788 | A1 | 11/2007 | Blinick et al. | |
| 2008/0098194 | A1 * | 4/2008 | Hashimoto et al. | 711/173 |
| 2008/0133047 | A1 * | 6/2008 | Best et al. | 700/215 |
| 2008/0204235 | A1 | 8/2008 | Cook | |
| 2008/0240044 | A1 * | 10/2008 | Khamar | 370/335 |
| 2009/0262382 | A1 * | 10/2009 | Nobutani | 358/1.15 |
| 2009/0276793 | A1 * | 11/2009 | Cabezas et al. | 719/321 |

(Continued)

OTHER PUBLICATIONS

"Read." Dictionary.com Unabridged. Random House, Inc. Jan. 16, 2015. <Dictionary.com http://dictionary.reference.com/browse/read>.*

*Primary Examiner* — Faisal M Zaman
(74) *Attorney, Agent, or Firm* — Katherine S. Brown; Jeffrey L. Streets

(57) ABSTRACT

A verified cluster configuration is collected and stored by a central management entity. Servers within the cluster are connected to network cables, where each of the servers has at least one network port and memory storing a port identification code for each network port, and where each network cable has memory storing a cable identification code. For each verified connection between a network cable and a network port, the port identification code is stored in the memory of the network cable and the cable identification code is stored in the memory of the corresponding server. The data identifying each connection is stored by the central management entity and includes the port identification code for a particular network port in association with the network cable identification code for the corresponding network cable. Any miswiring of the configuration is identified by the central management entity and easily corrected by the administrator.

13 Claims, 5 Drawing Sheets

(56) References Cited

U.S. PATENT DOCUMENTS

| | | | |
|---|---|---|---|
| 2009/0327727 A1* | 12/2009 | Meijer et al. | 713/170 |
| 2011/0320799 A1* | 12/2011 | Lam | 713/2 |
| 2013/0021597 A1* | 1/2013 | Carlson et al. | 356/73.1 |
| 2013/0024563 A1* | 1/2013 | Torigoe et al. | 709/224 |
| 2013/0181816 A1* | 7/2013 | Carlson et al. | 340/10.1 |
| 2014/0045368 A1* | 2/2014 | Gambardella et al. | 439/502 |

\* cited by examiner

CABLE ADAPTER CORRELATION IN A CLUSTER

BACKGROUND

1. Field of the Invention

The present invention relates to cabling of a cluster to achieve a verified cabling configuration.

2. Background of the Related Art

In a cluster configured rack environment, completely wired rack systems are shipped to the customer. Also, the rack-to-rack connections are verified in manufacturing and labeled. However, they are disconnected and then shipped to the customer. The rack-to-rack cabling in manufacturing allows the proper length of cable to be attached and ensures the two end points of the interconnection properly equalize electrical parameters and interoperate correctly in manufacturing. Also, Ethernet VLANs are configured in manufacturing to ensure proper operation of the Ethernet configuration.

When the cluster equipment arrives at an end-user site, someone is responsible for re-attaching the cables to the correct position with the cluster. If the cables are not attached to the correct port or if a label is lost, there could be problems with the operation of the cluster. If the cables are incorrectly attached, the cable lengths could be mismatched resulting in some cables being too short, the electrical parameters in the adapters might not match the electrical parameters of the cables. If Ethernet cables are misplugged, the Ethernet configuration may have problems.

BRIEF SUMMARY

One embodiment of the present invention provides a method for obtaining data describing a verified configuration of server. According to the method, a plurality of servers are connected to a plurality of network cables, where each of the plurality of servers have at least one network port and memory storing a port identification code for each network port, and each of the plurality of network cables having memory storing a cable identification code. For each connection between one of the network cables and one of the network ports, the port identification code is stored in the memory of the network cable and the cable identification code is stored in the memory of the server where the network port is located. A central management entity collects and stores data from each server that identifies each connection. The data identifying each connection includes the port identification code for a particular one of the network ports in association with the network cable identification code for the network cable that is connected to the particular one of the network ports.

Another embodiment of the invention provides a method for reconnecting a plurality of servers and a plurality of network cables in a verified configuration. The method establishes verified connections between a plurality of servers and a plurality of network cables, where each of the plurality of servers have at least one network port and memory storing a port identification code for each network port, and each of the plurality of network cables have memory storing a cable identification code. For each verified connection between one of the network cables and one of the network ports, the port identification code is stored in the memory of the network cable and the cable identification code is stored in the memory of the server where the network port is located. A central management entity collects and stores data from each server that identifies each verified connection, wherein the data identifying each of the verified connection includes the port identification code for a particular one of the network ports in association with the network cable identification code for the network cable that is connected to the particular one of the network ports. The method then disconnects each verified connection between one of the network cables and one of the network ports, and then reconnects the plurality of servers with the plurality of network cables to establish second connections between the plurality of servers and the plurality of network cables. After the disconnection and reconnection, the central management entity collects data from each server that identifies each second connection, wherein the data identifying each second connection includes the port identification code for a particular one of the network ports in association with the network cable identification code for the network cable that is connected to the particular one of the network ports. Any differences between the data identifying the each verified connection and the data identifying each second connection is provided to a user as output describing those differences.

DETAILED DESCRIPTION

Figure 1:
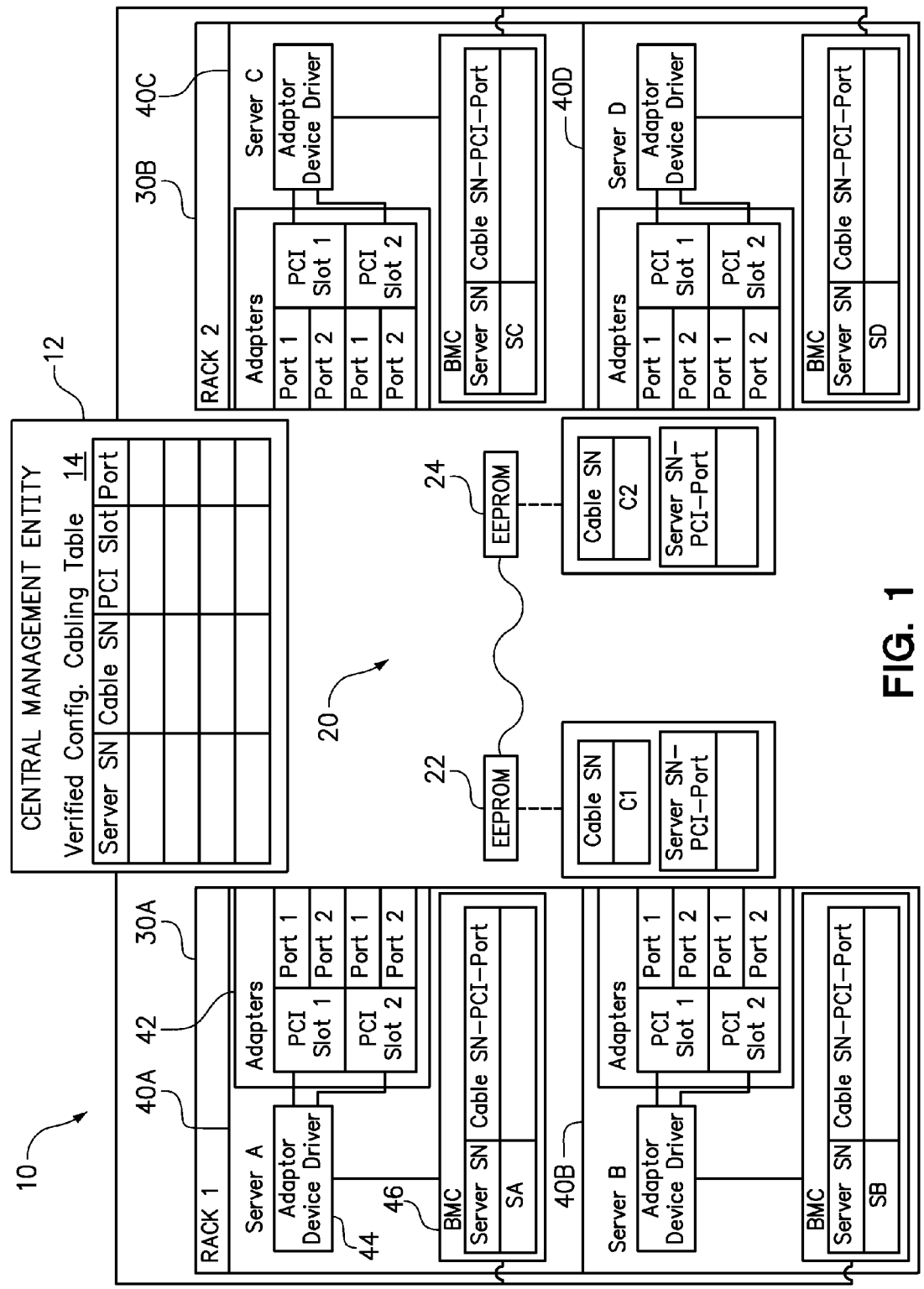
FIG. 1 is a block diagram of two server racks within a cluster prior to cables being connected between the two server racks.

One embodiment of the present invention provides a method for obtaining data describing a verified configuration of server. According to the method, a plurality of servers are connected to a plurality of network cables, where each of the plurality of servers have at least one network port and memory storing a port identification code for each network port, and each of the plurality of network cables having memory storing a cable identification code. For each connection between one of the network cables and one of the network ports, the port identification code is stored in the memory of the network cable and the cable identification code is stored in the memory of the server where the network port is located. A central management entity collects and stores data from each server that identifies each connection. The data identifying each connection includes the port identification code for a particular one of the network ports in association with the network cable identification code for the network cable that is connected to the particular one of the network ports.

The port identification code may take many forms consistent with the present invention. However, each port identification code is preferably unique within the network. In one embodiment, the port identification code identifies the server and port number where the network port is located. Since each server has a unique serial number, use of the server serial number in the port identification code assures that ports in different servers have unique port identification codes. Especially in servers having multiple adapter devices, the port identification code may further include a PCI slot number identifying a slot where a network adapter including the network port is installed. For example, a port identification code may be a concatenated description of a communication pathway to the port, such as Server S/N-PCIe slot-port, e.g. 45AC12345-3-2. If a server has more than one type of adapter, the server will have an adapter device driver for each type of adapter.

The network cables include a memory device, such as an electronically erasable programmable read only memory (EEPROM). A suitable EEPROM may, for example, be defined by the Multi-Source Agreement standard. Preferably, the memory of the network cable includes a first memory device located adjacent a first cable connector and a second memory device located adjacent a second cable connector. The memory device stores the cable serial number for that particular network cable and includes further user memory capable of storing additional information, such as the port identification code associated with a network port where that particular network cable should be connected.

The memory of the server may be managed by a baseboard management controller that is part of the server. A baseboard management controller (BMC) is an out-of-band processor that manages the interface between system management software and platform hardware. Memory managed by the BMC may store the server identification code, such as the server's unique serial number. The BMC also has the ability to gather the network cable identification for each network connection within the server.

The central management entity may be a remote management node. A preferred central management entity is the xCAT management entity (available from International Business Machines Corporation of Armonk, N.Y.). So long as AC power is applied to the server, standby power is turned on to the base board management controller. Therefore, the central management entity is able to communicate with the baseboard management controller of each server throughout an entire cluster to collect connection information from the baseboard management controllers of each server, and store a table that correlates each cable identification code (i.e., a cable serial number) with a particular port identification code (i.e., a particular server, slot and port).

When the cluster has been manufactured and verified, connection information is exchanged between each server port and the cable connector connected thereto. The connection information is also collected and stored in the central management entity, such as a table that identifies every pairing of network port and cable. Specifically, when an attached cabling configuration is verified in manufacturing, then and only then is the port identification code written to the user space in the EEPROM of the attached cable. This assigns the cable connector to a specific network port. In one example, the cable EEPROM stores the port identification code in the form of ServerSN-PCISlot#-Port# at the time of system verification, and saves this information for use at the time of installation at the user site. According to such a port identification code, a cable storing 45FA1234-3-2 would identify this cable as being plugged in port 2 of PCIe adapter 3 in server 45FA1234. In a similar manner, the cable serial number is sent to the adapter device driver in the server. The association between the cable and an adapter port may be identified by a concatenated description of a communication pathway, such as Cable S/N-PCIe slot-port. In this case, the adapter device driver does the cable S/N concatenation. The server then stores the Cable S/N-PCIe slot-port connection information in a baseboard management controller (BMC).

Another embodiment of the invention provides a method for reconnecting a plurality of servers and a plurality of network cables in a verified configuration. The method establishes verified connections between a plurality of servers and a plurality of network cables, where each of the plurality of servers has at least one network port and memory storing a port identification code for each network port, and each of the plurality of network cables has memory storing a cable identification code. For each verified connection between one of the network cables and one of the network ports, the port identification code is stored in the memory of the network cable and the cable identification code is stored in the memory of the server where the network port is located. A central management entity collects and stores data from each server that identifies each verified connection, wherein the data identifying each of the verified connection includes the port identification code for a particular one of the network ports in association with the network cable identification code for the network cable that is connected to the particular one of the network ports. The method then disconnects each verified connection between one of the network cables and one of the network ports, and then reconnects the plurality of servers with the plurality of network cables to establish second connections between the plurality of servers and the plurality of network cables. After the disconnection and reconnection, the central management entity collects data from each server that identifies each second connection, wherein the data identifying each second connection includes the port identification code for a particular one of the network ports in association with the network cable identification code for the network cable that is connected to the particular one of the network ports. Any differences between the data identifying the each verified connection and the data identifying each second connection is provided to a user as output describing those differences.

The output preferably indicates the port identification code for a target network port that is connected to a target network cable forming a second connection that is not a verified connection. Most preferably, the output may further indicate the port identification code for a destination network port where the target network cable should be connected. Having received the output, a system administrator may easily disconnect the cable that is connected to the incorrect target network port and reconnect the cable to the correct destination network port.

In a further embodiment of the invention, the server may provide a local indicator that the target network cable has been connected to the destination network port in a verified connection. For example, the adapter device may include a light, such as a light emitting diode (LED), adjacent each port that can be used to indicate a proper connection, an improper connection, or both. For example, the adapter device may include a red LED adjacent its network port, where the LED is activated in response to the adapter device driver detecting that an incorrect network cable has been connected thereto. Furthermore, the adapter device may include a green LED adjacent its network port, where the LED is activated in response to the adapter device driver detecting that a correct network cable has been connected thereto. Other and further lighting configurations and schemes may be similarly implemented. Any of these examples may provide the user with the immediate local feedback indicating whether or not the correct connection has been achieved. Although the central management entity may sense that the connection is consistent with the verified configuration, the user will immediately know that the appropriate cable connection has been achieved without having to go back to the remote location of the central management entity.

Consistent with embodiments of the present invention, once a rack of servers, switches and other information technology equipment has been configured and tested, the cabling inside the rack remains the same during shipment to a user site. However, the rack-to-rack cabling is labeled to identify the port to which it is connected and then removed so that the racks can be shipped. When the cluster arrives on site, the rack-to-rack cables that were verified during manufacturing must be reconnected. This reconnection is performed by a person reading a system diagram and the labels previously attached to the cables. However, a person can still make a mistake or the labels may detach from the cables. Furthermore, this reconnection of the cables is performed while the system power is still turned off, such that during reconnection the user receives no indication whether or not the network cables are connected to the correct network port in accordance with the verified configuration.

After all of the network cables have been manually reconnected, power may be supplied to the system. Once the power is turned on to the central management entity, the BMCs and the Ethernet network, the central management entity can scan all the servers and switches in the system and identify each of the actual connections that the person has made. The central management entity may then compare the actual connections to the previously stored data identifying the verified connections, identify locations where cables are misconnected, and notify the person to correct the cable connection location. Optionally, the notification is in the form of an error message identifying the ServerSN-PCISlot#-Port# location where an improper cable is attached and the ServerSN-PCISlot#-Port# location where that cable should be connected. The ServerSN-PCISlot#-Port# that is collected from the BMC indicates where the improper cable connection can be found for disconnection, and the ServerSN-PCISlot#-Port# that is collected from the cable EEPROM identifies where the cable should be reconnected. Alternatively, since the central management entity already has a complete verified connection table, once the improper cable connection has been identified, the central management entity can use the verified connection table to determine where the identified cable should be connected. In one example, the error message consists of highlighting a record in the actual connection table, where the highlighted record contains the port identification code for the network port having a cable that should be disconnected and, preferably, also contains the port identification code for the network port where the cable should be reconnected.

The adapter device driver has access to both the BMC and the cable EEPROM and is thus able to identify both a proper cable connection and the proper destination of an improper cable connection, without relying upon communication with the management node. This allows a user to correct an improper cable attachment and receive immediate feedback from the adapter device of the server indicating that the connection is now correct. For example, when the CableSN-PCTSlot#-Port# stored in the BMC of a given server (where the BMC further stores the ServerSN) is consistent with the ServerSN-PCTSlot#-Port# stored in the EEPROM of the cable (where the EEPROM further stores the CableSN), then the BMC may cause a light adjacent the port to light green. This type of local validation tells the user whether the actual connection is the verified connection without having to physically return to the central management entity. Furthermore, with some installations having even as many as 10,000 servers, a time saving step such as immediate visual validation can save a great amount of time.

In one embodiment, if the cable is connected to the correct adapter port according to the verified configuration, then the BMC may send a message to the central management entity identifying the correct connection. However, if the cable is misconnected to an incorrect adapter port per the verified configuration, then the BMC sends an error message indicating an incorrect cable connection exists at a particular network port (i.e., a target port identification code ServerSN-PCTSlot#-Port#). Also within the error message, the BMC may identify the network port (i.e., a destination port identification code ServerSN-PCTSlot#-Port#) where the cable from the incorrect cable connection should be moved to establish a verified connection. The central management entity may then alert the user about the incorrect cable connection and how to disconnect and reconnect the cable to establish a verified connection.

Whereas the above description focuses on server-adapter-cable connections, one skilled in the art knows that this same methodology can be used to identify switch port-cable connections. Accordingly, a cable configuration with respect to a switch can also be stored during setup at a manufacturing site, and then used to verify that the same cable configuration is achieved at a user site.

In a further embodiment, the central management entity may identify a list of actual connections that are not consistent with the verified connections, and identify any incorrect connections where the cable should be moved. However, the central management entity may also scan the list to identify any pair of incorrect connections that would simply result in the same cable being reversed, such that the same cable would be connected to the same ports albeit with first and second end connectors changing places. Since a cable may be presumed to perform the same in either orientation, the central management entity may, according to user preferences, be programmed to ignore the reversed cable. In such a situation, the cable EEPROM at each end of the cable might be erased and rewritten with the new port identification code so that any indicator lights on the adapter device will indicate that the connection is proper.

FIG. 1 is a block diagram of two server racks 30A, 30B within a cluster 10 prior to cables 20 being connected between the two server racks. Each server rack 30A, 30B includes any number of servers and switches, although only two servers 40A, 40B are shown in the first rack 30A, and only two servers 40C, 40D are shown in the second rack 30B. As shown, the construction of each server is the same. For example, Server A (40A) includes adapters 42, an adapter device driver 44, and a baseboard management controller 46. The adapters 42 may include only a single adapter or multiple adapters of different types, but are shown as two adapters of the same type. Adapters of different types would require separate adapter device drivers. Each adapter is installed in a PCI/PCIe slot (here slot 1 or slot 2), and is shown in this example to include two ports (here port 1 and port 2) per adapter. The adapter device driver 44 communicates with each adapter as well as the baseboard management controller 46, which has memory that stores the server serial number ("Server SN") and is able to store a cable identification code such as CableSN-PCI#-Port#.

A single network cable 20 is shown having two end connectors 22, 24 with EEPROM memory therein. The EEPROM memory stores the cable serial number (Cable SN) and is able to store a port identification code such as ServerSN-PCI#-Port# when such code is written to the EEPROM.

Each server 40A-40D has a separate cable connection to a remote management entity 12. Although the central management entity 12 has many components and functions in the normal operation of the cluster, the central management entity 12 has memory that stores an application program for collecting and storing connection data from the cluster. This connection data is illustrated as a verified configuration cabling table 14 which, for each connection, stores the server serial number, cable serial number, PCI slot number and port number. Optionally, the table 14 may store the full port identification code, such as ServerSN-PCI#-Port#, and the full cable identification code, which may be either the cable serial number or CableSN-PCI#-Port#. It is not necessary to store any redundant information.

Figure 2:
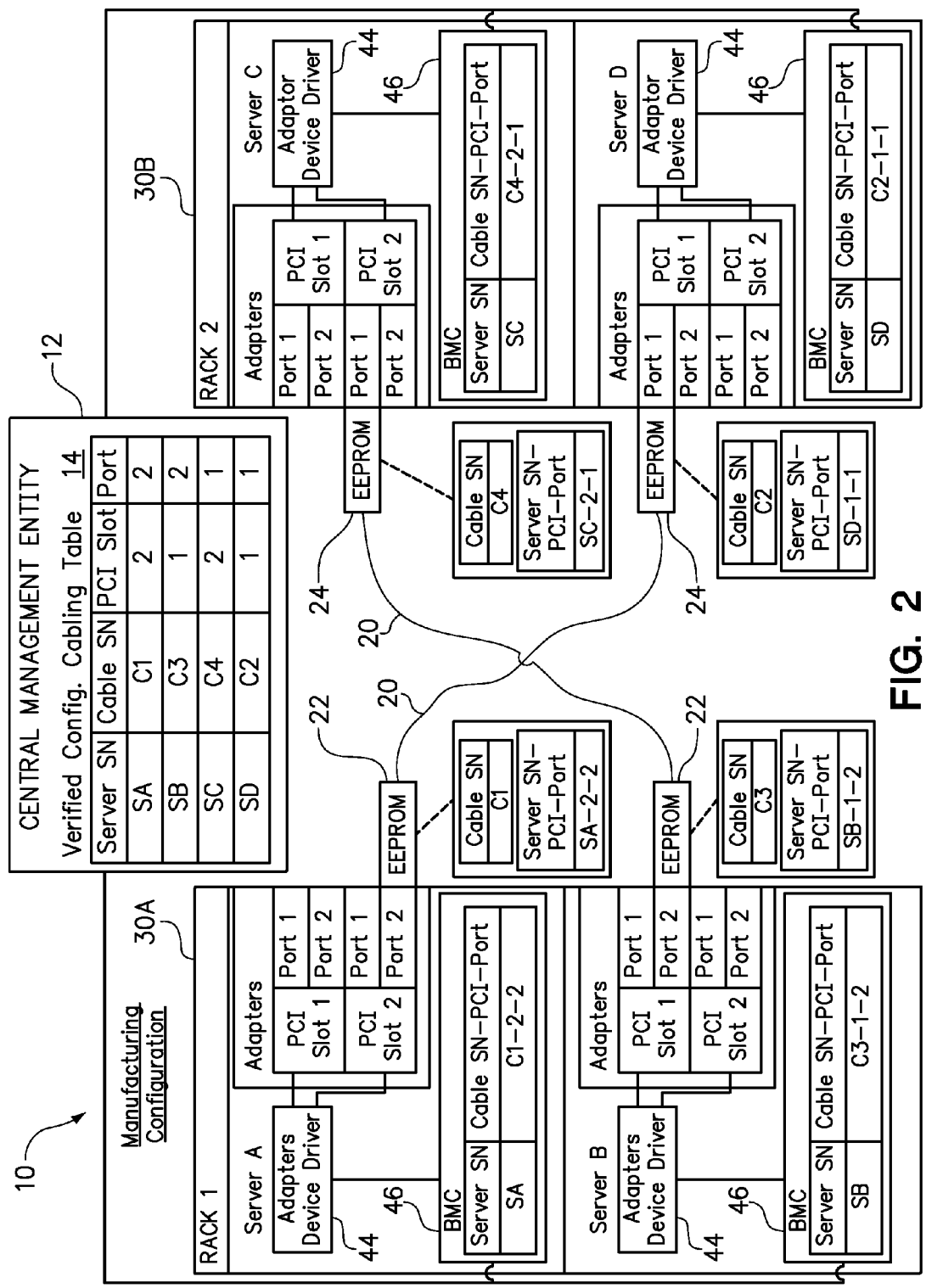
FIG. 2 is a block diagram of two server racks within a cluster after the configuration of the cluster has been verified.

FIG. 2 is a block diagram of the two server racks 30A, 30B within the cluster 10 after the configuration of the cluster has been verified. Upon verification, the adapter device driver 44 in each server reads the server serial number from the BMC 46 and writes the port identification code ServerSN-PCI#-Port# to the user space in the EEPROM of the cable connector that is connected to a particular port. Accordingly, the EEPROM of each cable is shown storing the associated cable serial number as well as the port identification code. Although both EEPROM of the cable may have the same serial number, this illustration uses a separate serial number for each end connector. The adapter device driver 44 in each server also reads the cable serial number from the cable connector 22, 24 and writes the cable identification code CableSN-PCI#-Port# to the memory in the BMC 46. The data written to the cables and to the BMCs will be used when the cluster is being reconnected at a user site. However, the cable and port data is also communicated via the BMCs 46 to the central management entity 12 to be stored in the table 14.

Figure 3:
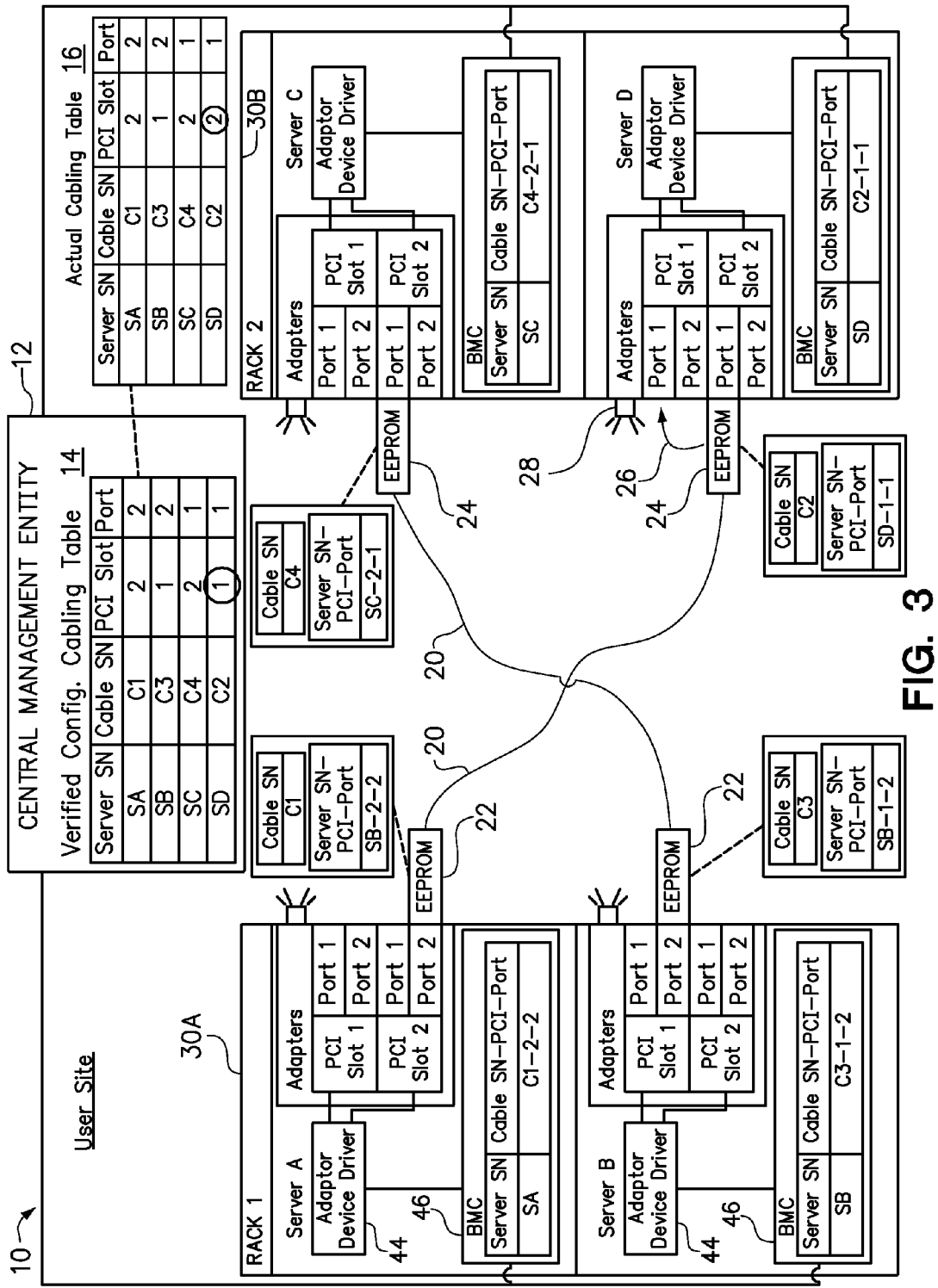
FIG. 3 is a block diagram of two server racks within a cluster after cables have been reconnected between the two server racks at a user site.

FIG. 3 is a block diagram of the two server racks 30A, 30B within the cluster 10 after the cables 20 have been reconnected between the two server racks at a user site. As with the verified connections, data about the actual connections is collected by the central management entity 12 and stored in an actual connection cabling table 16. When the central management entity 12 compares the actual connection cabling table 16 to the verified configuration cabling table 14, the only difference found in this example is circled in both tables. This indicates that the cable connector having cable serial number C2 has actually been connected into port SD-2-1 (ServerSN-PCI#-Port#), but should be connected into port SD-1-1 (ServerSN-PCI#-Port#). Accordingly, the central management entity 12 produces some type of output to notify the user to move the cable connector at port SD-2-1 and reconnect the same cable connector at port SD-1-1. The arrow 26 shows the desired disconnection and reconnection. Upon reconnecting the cable connector C2 into port SD-1-1, the adapter device driver in Server D detects the correct connection and energizes a green light 28 associated with port SD-1-1. Optionally, the actual cabling table 16 could be further updated to reflect the corrected connection.

Figure 4:
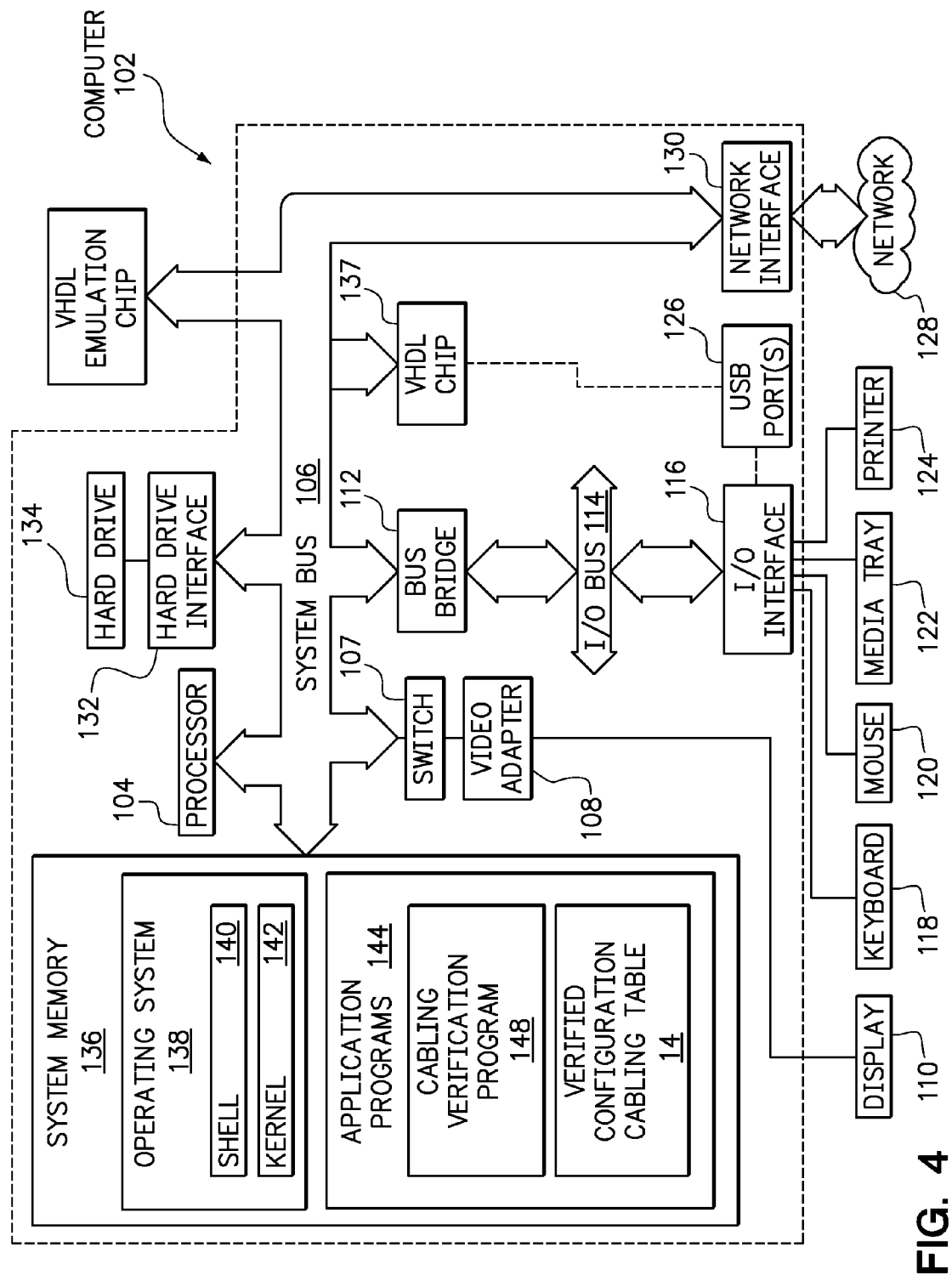
FIG. 4 is a block diagram of a computer.

FIG. 4 is a diagram of an exemplary computing node (or simply "computer") 102 that may be utilized in accordance with one or more embodiments of the present invention. Note that some or all of the exemplary architecture, including both depicted hardware and software, shown for and within computer 102 may be utilized in either or both of the central management entity 12 and the servers 40A-40D in the racks 30A, 30B as shown in FIGS. 1-3.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, the computer 102 is able to communicate over a network 128 using a network interface (network adapter device) 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management. Application programs 144 in the system memory of computer 102 may include an electronic transaction program 148 and an authentication module 150 for implementing the methods described herein.

Also stored in the system memory 136 is a VHDL (VHS IC hardware description language) program 139. VHDL is an exemplary design-entry language for field programmable gate arrays (FPGAs), application specific integrated circuits (ASICs), and other similar electronic devices. In one embodiment, execution of instructions from VMPP 148 causes the VHDL program 139 to configure the VHDL chip 137, which may be an FPGA, ASIC, or the like.

In another embodiment of the present invention, execution of instructions from VMPP 148 results in a utilization of VHDL program 139 to program a VHDL emulation chip 151. VHDL emulation chip 151 may incorporate a similar architecture as described above for VHDL chip 137. Once VMPP 148 and VHDL program 139 program VHDL emulation chip 151, VHDL emulation chip 151 performs, as hardware, some or all functions described by one or more executions of some or all of the instructions found in VMPP 148. That is, the VHDL emulation chip 151 is a hardware emulation of some or all of the software instructions found in VMPP 148. In one embodiment, VHDL emulation chip 151 is a programmable read only memory (PROM) that, once burned in accordance with instructions from VMPP 148 and VHDL program 139, is permanently transformed into a new circuitry that performs the functions needed to perform the processes of the present invention.

The hardware elements depicted in computer 102 are not intended to be exhaustive, but rather are representative components suitable to perform the processes of the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 5:
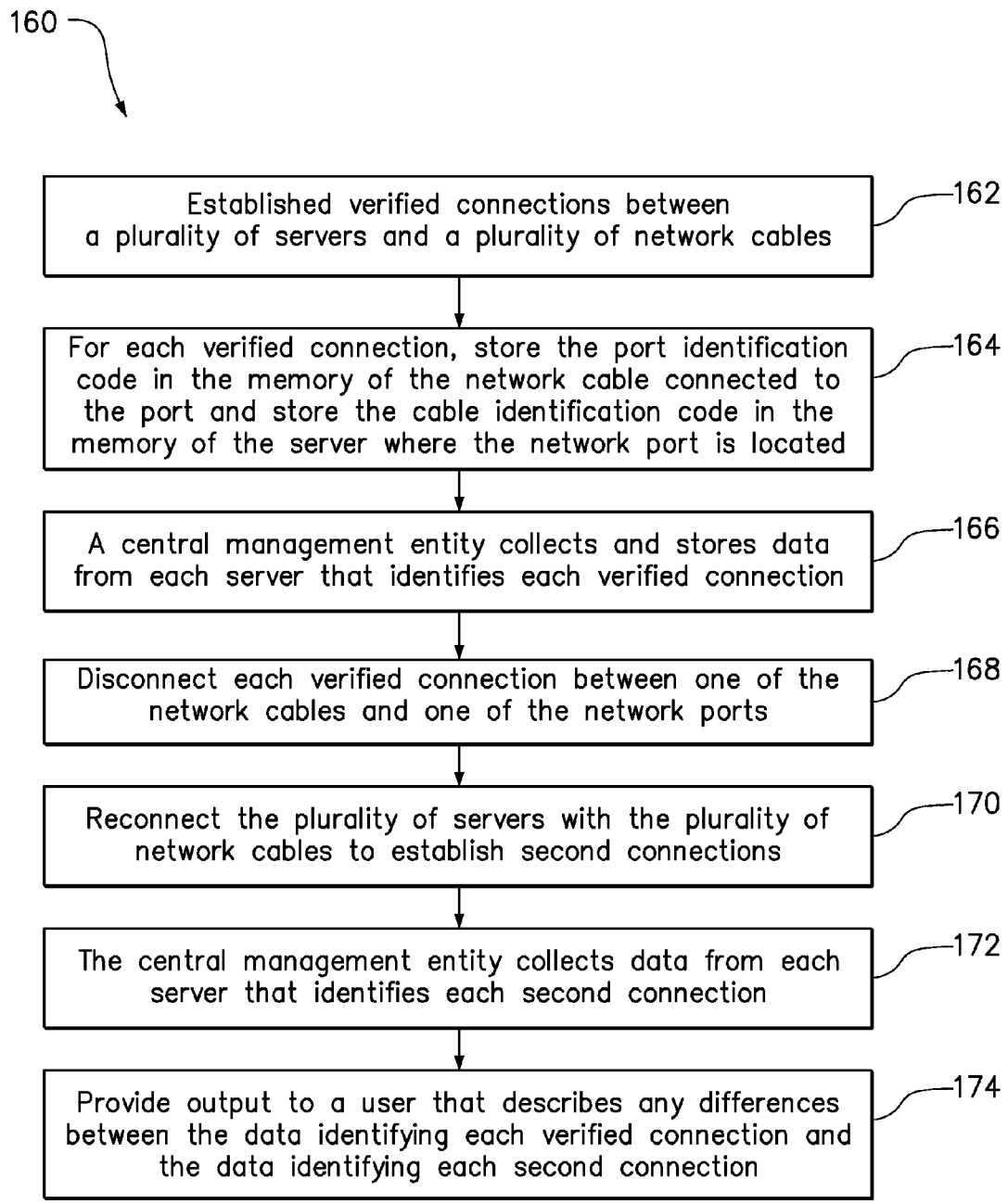
FIG. 5 is a flowchart of a method in accordance with one embodiment of the invention.

FIG. 5 is a flowchart of a method 160 according to one embodiment of the invention. In step 162, the method establishes verified connections between a plurality of servers and a plurality of network cables. Preferably, each of the plurality of servers has at least one network port and memory storing a port identification code for each network port, and each of the plurality of network cables has memory storing a cable identification code. In step 164, for each verified connection between one of the network cables and one of the network ports, the port identification code is stored in the memory of the network cable and the cable identification code is stored in the memory of the server where the network port is located. In step 166, a central management entity collects and stores data from each server that identifies each verified connection. The data identifying each of the verified connections includes the port identification code for a particular one of the network ports in association with the network cable identification code for the network cable that is connected to the particular one of the network ports. After disconnecting each verified connection between one of the network cables and one of the network ports in step 168, the plurality of servers are reconnected with the plurality of network cables to establish second connections between the plurality of servers and the plurality of network cables in step 170. In step 172, the central management entity collects data from each server that identifies each second connection. The data identifying each second connection includes the port identification code for a particular one of the network ports in association with the network cable identification code for the network cable that is connected to the particular one of the network ports. Output is provided to a user, in step 174, which describes any differences between the data identifying each verified connection and the data identifying each second connection. It may be appreciated that the first four steps 162-168 of the method 160 are typically performed at a first location, such as a cluster manufacturing facility, and the last three steps 170-174 are typically performed at a second location, such as a user site.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    connecting a plurality of servers to a plurality of network cables, each of the plurality of servers having at least one network port and memory storing a port identification code for each network port, and each of the plurality of network cables having memory storing a cable identification code, wherein the port identification code includes a PCI slot number identifying a slot where a network adapter including the network port is installed;
    for each connection between one of the network cables and one of the network ports, storing the port identification code in the memory of the network cable and storing the cable identification code in the memory of the server where the network port is located; and
    a central management entity collecting and storing data from each server that identifies each connection, wherein the data identifying each connection includes the port identification code for a particular one of the network ports in association with the network cable identification code for the network cable that is connected to the particular one of the network ports.

2. The method of claim 1, wherein the port identification code for each network port is unique within the network.

3. The method of claim 1, wherein the port identification code identifies the server and port number where the network port is located.

4. The method of claim 1, wherein the memory of the network cable is an EEPROM.

5. The method of claim 1, wherein the memory of the server is managed by a baseboard management controller that is part of the server.

6. The method of claim 1, wherein the memory of the network cable includes a first memory device located adjacent a first cable connector and a second memory device located adjacent a second cable connector.

7. A method, comprising:
    establishing verified connections between a plurality of servers and a plurality of network cables, each of the plurality of servers having at least one network port and memory storing a port identification code for each network port, and each of the plurality of network cables having memory storing a cable identification code, wherein the port identification code includes a PCI slot number identifying a slot where a network adapter including the network port is installed;
    for each verified connection between one of the network cables and one of the network ports, storing the port identification code in the memory of the network cable and storing the cable identification code in the memory of the server where the network port is located; and
    a central management entity collecting and storing data from each server that identifies each verified connection, wherein the data identifying each of the verified connection includes the port identification code for a particular one of the network ports in association with the network cable identification code for the network cable that is connected to the particular one of the network ports; and then
    disconnecting each verified connection between one of the network cables and one of the network ports; and then reconnecting the plurality of servers with the plurality of network cables to establish second connections between the plurality of servers and the plurality of network cables; and then the central management entity collecting data from each server that identifies each second connection, wherein the data identifying each second connection includes the port identification code for a particular one of the network ports in association with the network cable identification code for the network cable that is connected to the particular one of the network ports; and providing output to a user that describes any differences between the data identifying the each verified connection and the data identifying each second connection.

8. The method of claim 7, wherein the output indicates the port identification code for a target network port that is connected to a target network cable forming a second connection that is not a verified connection.

9. The method of claim 8, wherein the output further indicates the port identification code for a destination network port where the target network cable should be connected.

10. The method of claim 9, further comprising:

the server providing a local indicator that the target network cable has been connected to the destination network port in a verified connection.

11. The method of claim 7, wherein the memory of the network cable is an EEPROM.

12. The method of claim 7, wherein the memory of the server is managed by a baseboard management controller that is part of the server.

13. The method of claim 7, wherein the memory of the network cable includes a first EEPROM located adjacent a first cable connector and a second EEPROM located adjacent a second cable connector.

\* \* \* \* \*